Oct. 15, 1957     J. H. WARE, JR     2,809,727
ALUMINUM WINDOWS
Filed April 15, 1955     6 Sheets—Sheet 1
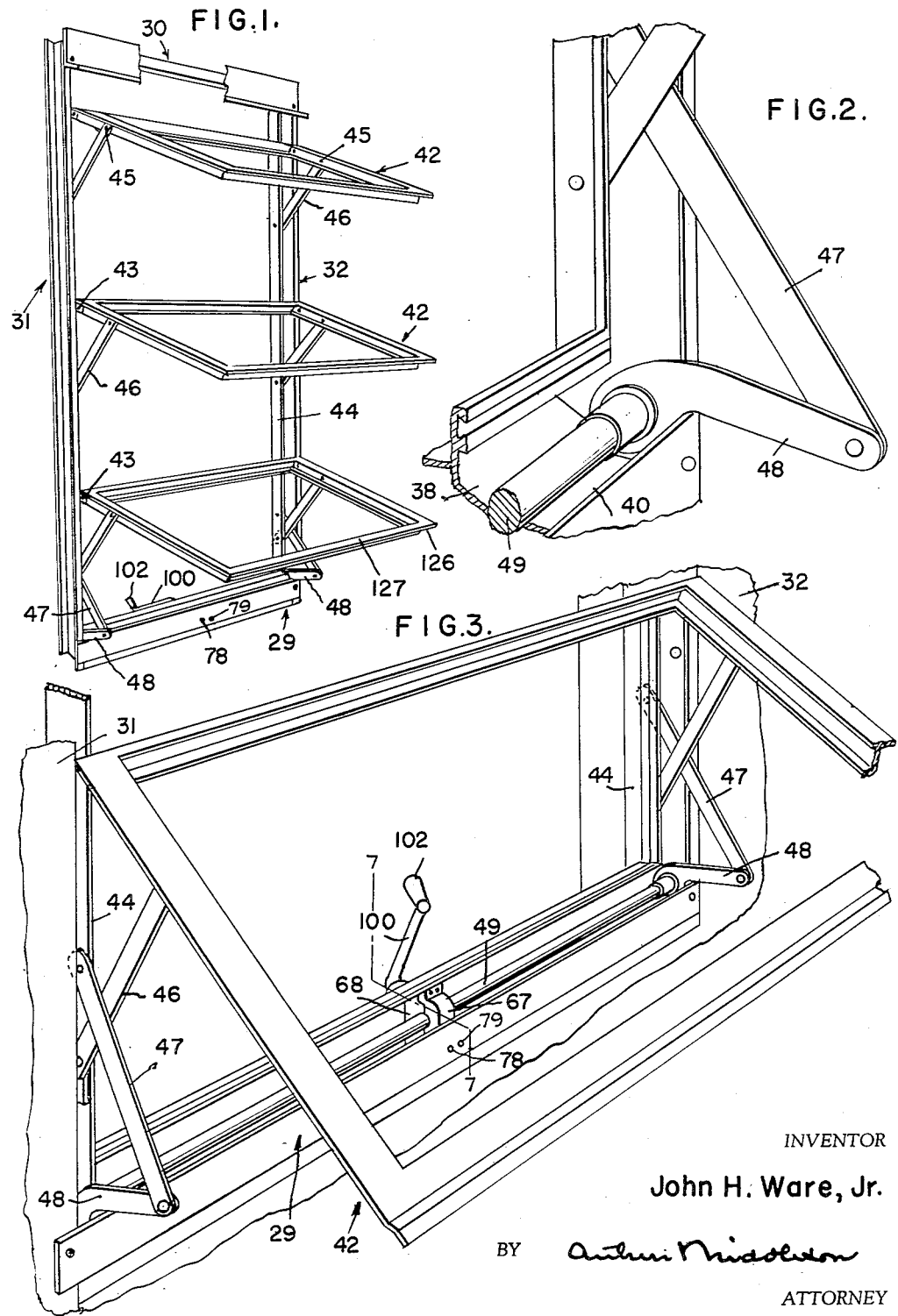
INVENTOR
John H. Ware, Jr.
BY Arthur Middleton
ATTORNEY Oct. 15, 1957 J. H. WARE, JR 2,809,727
ALUMINUM WINDOWS
Filed April 15, 1955 6 Sheets-Sheet 2
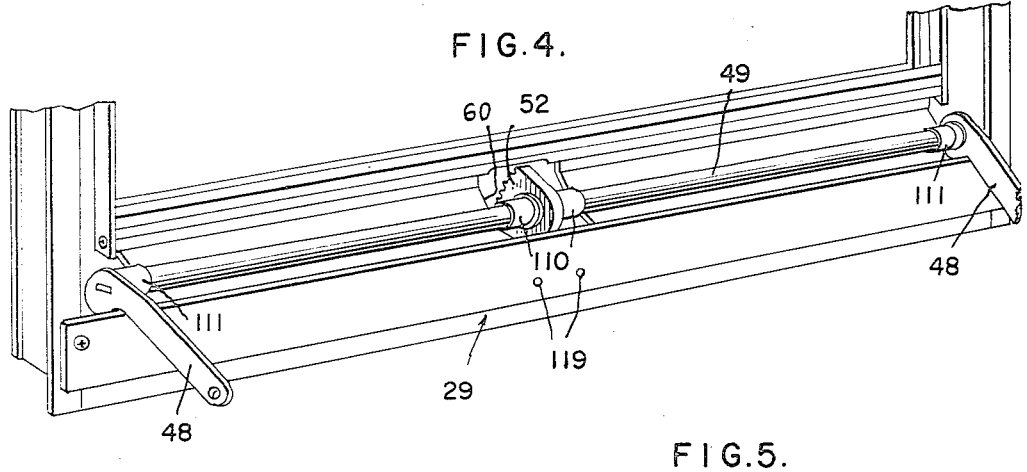
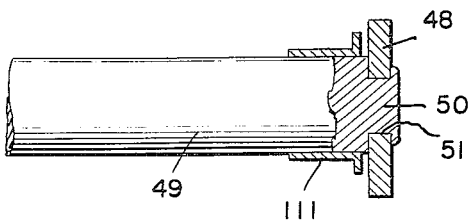
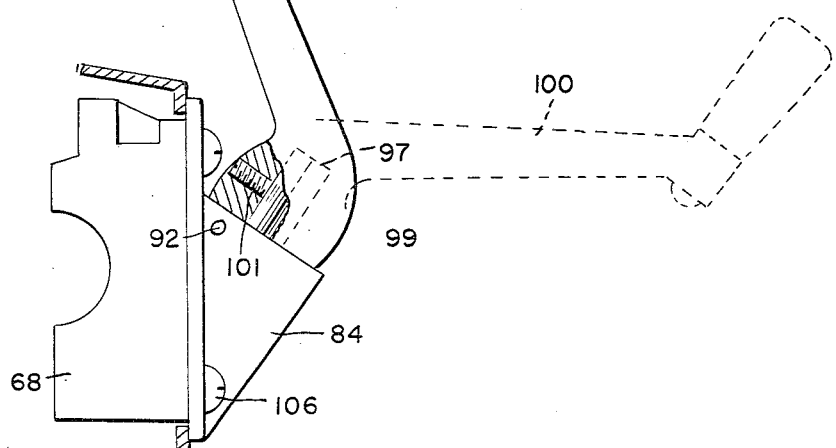
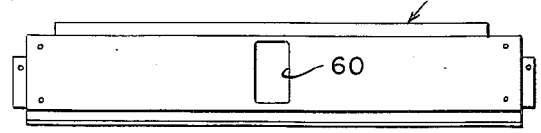
Inventor
John H. Ware, Jr.
By Arthur Middleton
ATTY.

Oct. 15, 1957 J. H. WARE, JR 2,809,727
ALUMINUM WINDOWS
Filed April 15, 1955 6 Sheets-Sheet 3
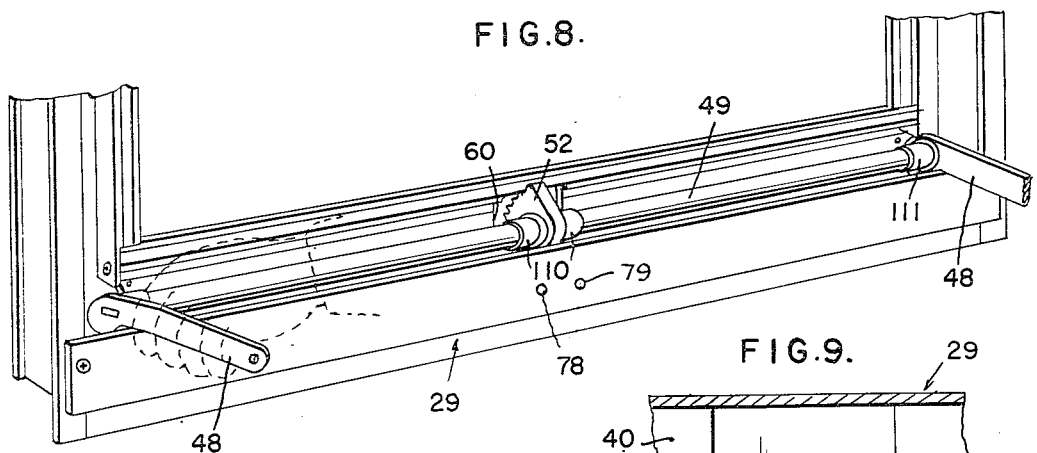
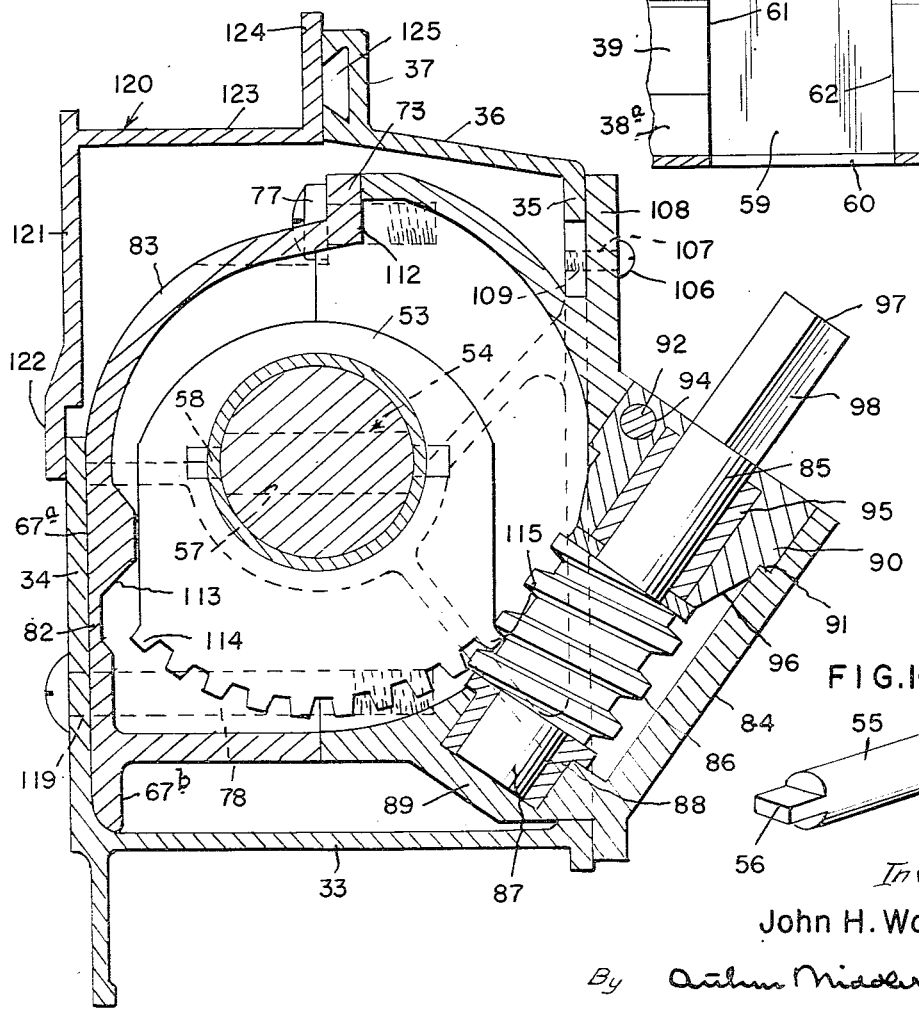
Inventor
John H. Ware, Jr.
By Arthur Middleton
ATTY.

Oct. 15, 1957  J. H. WARE, JR  2,809,727
ALUMINUM WINDOWS
Filed April 15, 1955  6 Sheets-Sheet 4
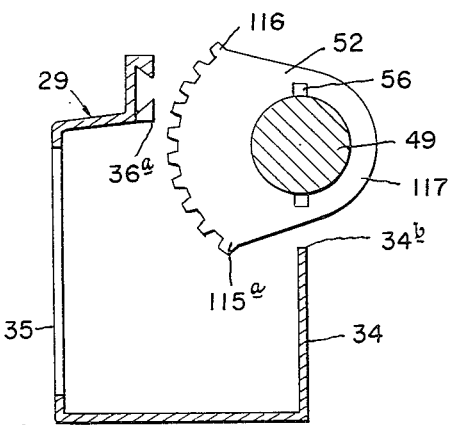
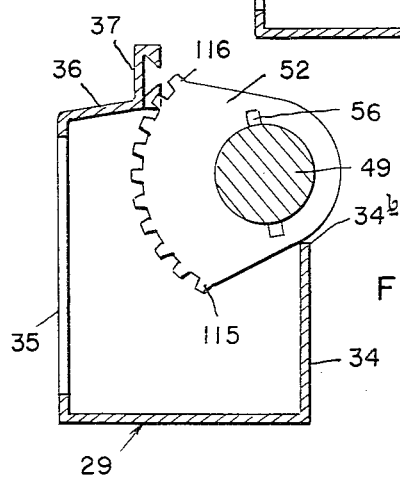
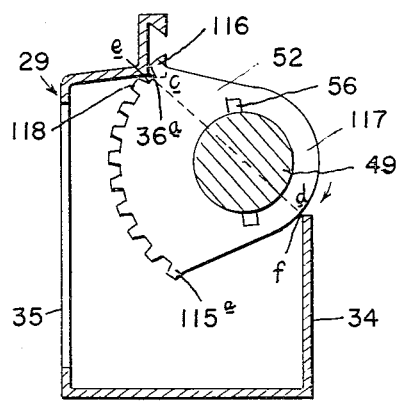
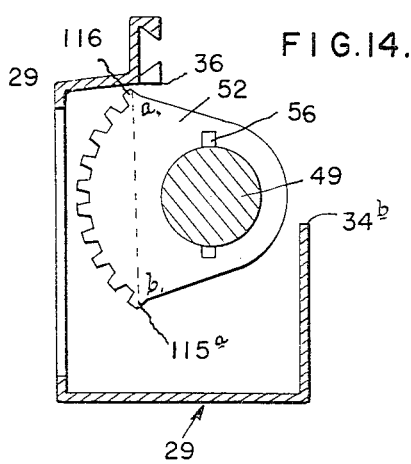
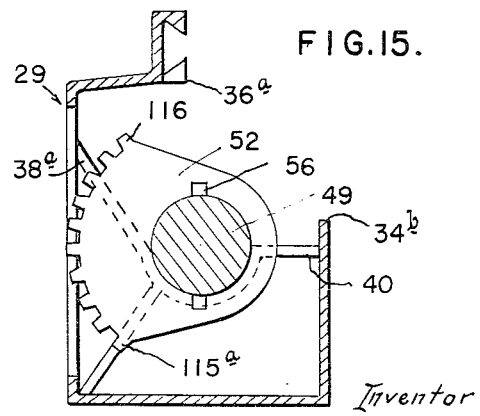
Inventor
John H. Ware, Jr.
By Arthur Middleton
ATTY.

Oct. 15, 1957  J. H. WARE, JR  2,809,727
ALUMINUM WINDOWS
Filed April 15, 1955  6 Sheets-Sheet 5

Inventor
John H. Ware, Jr.
By Arthur Middleton
ATTY.

Inventor
John H. Ware, Jr.
By Arthur Middleton
ATTY.

United States Patent Office 2,809,727
Patented Oct. 15, 1957

2,809,727
ALUMINUM WINDOWS
John H. Ware, Jr., Miami Beach, Fla.
Application April 15, 1955, Serial No. 501,493
4 Claims. (Cl. 189—69)

This invention relates to improvements in aluminum windows of the awning type that has a plurality of superposed glass-bearing sash (sometimes called vents) pivotally mounted along their top portions in a rectangular shaped window frame to be swung vertically to opened ond closed positions, the window frame including a sill member of general channel formation, vertical side members and a top member. There is operating mechanism for simultaneously swinging the sash members, such mechanism including a horizontally extending rock shaft located within the hollow sill member and there is a so-called manual operator consisting of a shaft mounted for rotation on the sill member to extend at right angles to the rock shaft and having a hand crank thereon, this operating shaft being connected by gearing to the rock shaft.

A serious problem encountered in the use of present day windows of the type mentioned is that it is difficult to obtain a tight fit and especially a wind-tight fit between the bottom bar or frame member of the lowermost sash and the sill member of the window frame. There is a tendency for the gears between the operator shaft and the rock shaft of the operating mechanism to become stripped due to excessive pressure being applied by the housewife to the hand crank of the operator. Also excessive force exerted by the housewife to the hand crank will sometimes, instead of stripping the gears, result in the bending apart of the sides of the hollow sill member or otherwise deforming it, and in the tilting of the operator shaft out of proper position.

Objects of the invention are to overcome these difficulties; to provide an improved awning type aluminum window that can be easily operated; that can be operated with considerable force so that the sash can be closed really tight against the frame to make them weather-tight, water-tight and non-whistling; that will be substantially fool proof so that no matter how hard the housewife turns the operator, the gears between the operator crank shaft and the rock shaft of the operating mechanism will not be stripped even though made of aluminum, and the sides of the hollow shell will not be bent apart or deformed and the operator shaft tilted out of proper alignment.

An important novel feature of the invention resides in the special construction of hollow extruded metal sill member reinforced in an efficient way and at the same time so constructed as to permit the rock shaft of the operator mechanism with its gear fixed thereon to be readily inserted into the same after the window frame has been installed in the window opening, without bending the sill structure and without the use of any tools so that installation of the rock shaft does not have to be made at the factory.

Another important novel feature of the invention resides in the special two-part mounting means for the rock shaft and operator or operator shaft, so constructed as to be readily insertable through a relatively small size opening into the sill member and secured to the sill member after the window frame has been installed.

Another important novel characteristic of the invention lies in the simple efficient stop means provided for limiting the stroke of the worm gear segment and preventing stripping of the gears or disengagement of the worm gear segment from the operator worm.

Still another important novel feature of the invention resides in the particular angular relationship of the operator shaft relative to the sill member so that the crank of the operator or operator shaft can be disposed horizontally below a curtain on the window frame or positioned to extend vertically behind the curtain.

Other important novel characteristics of the invention are the special means provided for keying the gear segment of the rock shaft thereto; in the provision of gearing compactly arranged and providing for great ratio of reduction and easy operation, and in the simple efficient means provided for securing elements of the reduction gear one to another.

The invention includes improvements in the hollow metal sill structure; in the means for keying the gear of the rock shaft thereto; in the means for mounting the operator or operator shaft on the sill member and arrangement of the operator crank relative to the inner side of the same; in the gearing between the operator shaft and the rock shaft to provide for great ratio of reduction and easy operation, and in the means for securing elements of the reduction gear one to another.

The invention, with other objects, novel features and the advantages thereof and the particular construction, combination and arrangements of parts comprising the same, will be understood from the following detailed description when considered in connection with the accompanying drawings forming part hereof and illustrating two embodiments of the invention.

In the drawings:

Fig. 1 is a perspective view taken from the outer side, of a window constructed in accordance with the present invention, the sash being shown in open position;

Fig. 2 is a perspective view to an enlarged scale taken from the outer side, of a corner portion of the window frame, and showing one end portion of the rock shaft, the crank thereon and the link connected to the crank;

Fig. 3 is a perspective view on an enlarged scale taken from the outer side, of the lower part of the window frame and the lowermost sash;

Fig. 4 is an outer perspective view looking from the outer side, of the lower part of the window frame and part of the operating mechanism;

Fig. 5 is a detail side elevation of one end portion of the rock shaft with one of the bearing sleeves thereon and showing the connection of one of the crank arms to the rock shaft;

Fig. 6 is a detail side elevation of one of the mounting or housing members for the rock shaft and operator, secured to the sill member;

Fig. 7 is a vertical section on the line 7—7 of Fig. 3;

Fig. 8 is a perspective view looking from the outer side, of the lower part of the window frame with the rock shaft partially inserted within the sill member;

Fig. 9 is a detail fragmentary horizontal section of the sill member taken on the line 9—9 of Fig. 16;

Fig. 10 is a detail perspective view of the pin for keying the gear segment to the rock shaft;

Figs. 11, 12, 13 and 14 are transverse sections of the sill member showing respectively successive steps in introducing the rock shaft with its segmental gear into the sill member;

Fig. 15 is a transverse section of the sill member with the rock shaft in operative position therein;

Fig. 23 is a perspective view of the sill member taken from the front side thereof.

Referring to a detail description of the particular embodiment of the invention illustrated in Figs. 1 to 19 of the drawings, the window frame comprises a sill member 29, a top member 30 and vertical side members 31 and 32, all formed of extruded aluminum. The sill member 29 and top member 30 are each of general U-shape channel form and are disposed with their open sides facing inwardly. The vertical side members 31 and 32 which are shown of general L-shape form in cross section have their opposite end portions fitting within the adjoining end portions of the sill member 29 and top member 30 and are secured thereto in any suitable way as by screws or the like (not shown), or by welding to form a substantially rigid frame.

Figure 16:
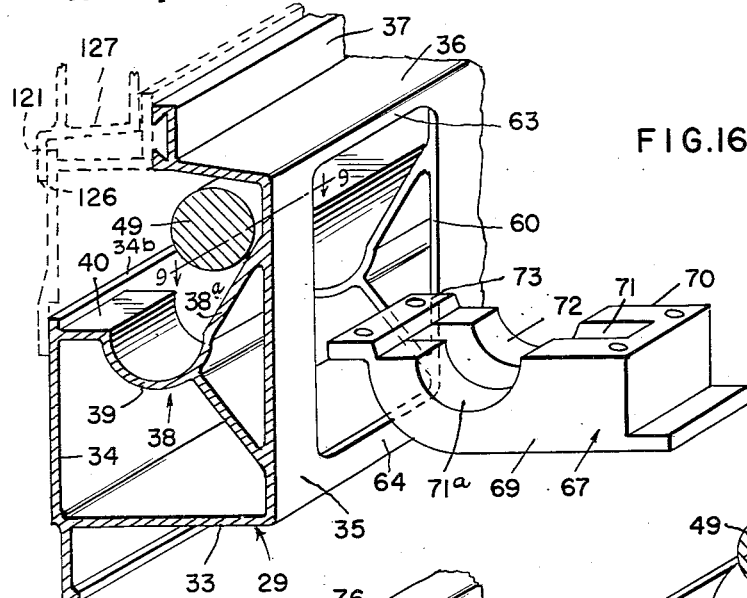
Figs. 16 and 17 are fragmentary perspective views of the sill member illustrating successive steps in introducing the rear section of the mouting or housing for the rock shaft, within the sill member.

The sill member 29 has a base or intermediate horizontal wall 33, a front side wall or face 34 and a rear side wall or face 35, the latter as shown being of greater height than the front side wall 34 and having a longitudinal flange 36 extending laterally and forwardly therefrom, the flange 36 having a relatively short inwardly directed extension 37. Referring particularly to Figs. 9, 16 and 23 of the drawings, the sill member 29 has reinforcing means interiorly thereof comprising a septum 38 extending lengthwise thereof and across the same from one side wall to the other, said septum having an upwardly disposed leg section or web 38ª and a downwardly disposed leg, both joined at their outer ends to the rear side wall 35 of the sill member intermediate the upper and lower edges thereof, an intermediate concave section 39 arcuate shaped in cross section, and a relatively short horizontal shelf-like section 40 extending from one side edge of the intermediate concave section 39 to the front side wall 34 near the upper edge 34ᵇ thereof. The septum 38, as will be understood, is integral with the sill member 29, the septum being formed with the sill member in the extrusion process. Also it is to be noticed that the shelf-like extension 40 is radially disposed with respect to the concave section 39, while the upwardly inclined leg or web 38ª is tangentially disposed with respect to that concave section.

A plurality of sash 42 are suitably mounted in superposed relation on horizontal pivots at their top portions at 43 within the window frame for swinging movement in a vertical plane.

Operating mechanism is provided for swinging the sash 42 in unison, the same including a pair of pitman rods 44 extending vertically alongside the side members 31 and 32 of the window frame at the inner side thereof in spaced relation thereto. As shown in Fig. 1 of the drawings, each sash 42 is connected at opposite ends at the upper part thereof at 45 to the pitman rods 44 by pivotal link connections 46, and the pitman rods 44 at their lower portions are in turn pivotally connected by link members 47 to the outer end portions of crank arms 48 which are fast upon opposite end portions of a rock shaft 49 supported within the sill member. The rock shaft 49 which is solid, is shown provided with reduced end portions 50 rectangular shaped in cross section. The outer end portions of the crank arms 48 are provided with openings 51 of a size and shape corresponding to that of the reduced end portions 50 of the rock shaft to fit thereon, and the reduced end portions 50 of the rock shaft 49 are upset as shown, to securely fasten the crank arms 48 to the rock shaft. On the rock shaft 49 centrally of the ends thereof, is a worm gear segment 52 keyed thereon to actuate the same.

The worm gear segment 52 which is provided with a central opening or hub 53 to fit on the rock shaft 49 and which, of course, is slipped on the rock shaft before the crank arms 48 are secured thereto, is made fast to the rock shaft 49 by a key 54 having a main cylindrical body part 55 and reduced flattened end portions 56 rectangular shaped in cross section, the cylindrical body part 55 of the key fitting in a cylindrical transverse bore or opening 57 in the rock shaft with its reduced flattened end portions 56 projecting beyond the outer face of the same and engaging slots 58 in the worm gear segment 52 adjoining the central opening 53 thereof. This special construction provides simple, efficient means for securing the worm gear segment 52 to the rock shaft 49 and at the same time provides for easy assembly of the worm gear segment on and fastening the same to the rock shaft, this being easily and quickly performed by fitting the key 54 in the transverse bore 57 of the rock shaft, slipping the worm gear segment 52 along the rock shaft to the key 54 and aligning the slots 58 of the worm gear segment with the flattened projecting end portions 56 of the key 54 and then forcing the worm gear segment laterally to position the same in the plane of the flattened end portions 56 of the key and the latter in tight fitting engagement with the slots 58 of the worm gear segment.

Referring particularly to Figs. 9 and 16 to 19, as shown in these views, a transverse section of the septum 38 centrally of the ends of the sill member 29 is removed so that a space 59 is provided within the sill member to accommodate a housing for the worm gear segment 52 and supporting means for the rock shaft 49, and the rear side wall 35 of the sill member 29 is provided with a rectangular shaped opening 60 centrally of the ends thereof adjoining the space 59, this opening being of a width corresponding to the distance between opposing inner end faces 61, 62 of the septum 38 at either side of the space 59, and the upper and lower edges 63, 64 of the opening 60 being located slightly inwardly of the top and bottom edges of the rear side wall 35 of the sill member, leaving narrow wall portions 65, 66 of the side wall 35 bordering the upper and lower edges of said opening. The housing referred to, which is of general rectangular shape, is composed of two mating parts or sections 67, 68, each having side walls 69, 70 laterally spaced from each other to provide a chamber 71 therebetween to receive and permit free rocking movement of the worm gear segment 52 therein, the side walls 69 and 70 intermediate their ends having complementary semi-circular shaped recessed portions 71ª, 72 fitting around and forming supporting bearings for the rock shaft 49 at either side of the worm-gear segment.

The sections 67 and 68 of the housing at their upper parts have interfitting shoulder portions 73, 74 which are provided with threaded apertures 75, 76 receiving screws 77 detachably securing the sections together. The housing sections are also connected by screws 78, 79 engaging threaded apertures 80 and 81 in the lower parts thereof. The housing section 67 has a rectangular shaped flange 67ᵇ projecting downwardly from the bottom face thereof, the outer face of the flange forming a continuation of the outer face 82 of the lower part of the housing section 67, and the upper part of this housing section 67 has a curved outer face 83 as shown. The other housing section 68 has a tubular extension 84 of generally cylindrical form extending upwardly and outwardly at an inclination from the lower outer portion thereof and in which is journaled the operator or operator shaft 85, the latter having fixedly secured thereto or formed integral therewith a worm 86 which meshes with the worm gear segment 52. The lower end portion 87 of the operator shaft 85 fits in a bushing 88 supported in a bearing 89 in the bottom part of the tubular extension 84. The operator or operator shaft 85 at its upper end portion is supported in a collar 90 which fits into the upper end portion of the tubular extension 84 and is held in position with its lower end against a shoulder portion 91 of said tubular extension by a keeper pin 92 engaging aligned transversely extending apertures 93 and 94 in the bearing collar 90 and the adjoining upper part of the tubular extension 84. 95 designates a bushing supported in the bearing collar 90, the latter having a lower downwardly tapering extension 96, the lower end of which fits against the upper end of the worm 86. The operator shaft 85 has an upper end portion 97 projecting outside of the bearing collar 90 and formed with angularly related face portions 98. Fitting on the upper end portion 97 of the operator shaft is the socket part 99 of a hand crank 100, said socket portion being formed correspondingly to the cross sectional shape of the upper end portion 97 of the operator shaft 85 to fit thereon so that turning of the hand crank 100 will rotate the operator shaft 85 and actuate the rock shaft 49, and the sash 42 through the crank arms 48, pitman rods 44 and link connections 46 and 47 will be swung inwardly or outwardly in accordance with the direction of rotation of the operator shaft 85. The hand crank 100 is detachably secured on the upper end portion 97 of the operator shaft 85 by a set screw 101. The handle 102 of the crank 100, which as shown has a conventional swivel connection 103 therewith, extends parallel to the operator shaft 85, the hand crank 100 extending at an obtuse angle to the operator shaft.

The sectional housing 67, 68 fits nicely into space 59 within the sill member 29 between the opposing inner ends 61 and 62 of the reinforcing septum 38, the housing being thus held against movement longitudinally of the sill member 29 by the inner ends of the septum 38. The outer face 67ᵃ of the housing section 67 fits against the inner face of the front side wall 34 of the sill member 29, the lower edge of the flange 67ᵇ and the bottom portion of the tubular extension 84 resting upon the base or horizontal wall 33 of the sill member 29, the housing being secured firmly seated in position within the sill member 29 by screws 106 engaging threaded apertures 107 in an attaching plate portion 108 on the outer side of the housing member 68 and apertures 109 in the rear side wall 35 of the sill member 29, said attaching plate portion projecting laterally from the marginal edges of the outer side of the housing section 68 and fitting against the outer face of the rear side wall 35 of the sill member.

As shown in the drawings, when the housing 67, 68 is assembled with the rock shaft 49 in position within the sill member 29, the rock shaft 49 is disposed along and over the upper face of the concave section 39 of the reinforcing septum 38 parallel therewith so that said concave section 39 of the septum serves as supporting means for the rock shaft 49, the septum 38 thus functioning in this manner in addition to acting as rigidifying means for the sill member 29, and the rock shaft 49 being advantageously supported at opposite ends as well as at its central part to insure easy smooth oscillation of the same. 110 designates bushings fitting in the recessed portions 71ᵃ and 72 of the housing sections 67, 68, and 111 are bushings at opposite end portions of the rock shaft 49 held in position by engagement of the outwardly extending annular end flanges thereof abutting against the outer ends of the concave section 39 of the septum 38, the rock shaft extending through these bushings, the bushings 110 fitting within the recessed portions 71, 72 of the housing section 67, 68, and the bushings 111 fitting upon the concave section 39 of the septum 38 when the rock shaft 49 with its worm gear segment has been assembled within the sill member 29. The bushings 110 and 111 are preferably constructed of nylon or like material.

The worm gear segment 52 in extent is substantially a quadrant to effect substantially a 90° throw of the crank arms 48. The invention provides in a simple, advantageous way for limiting the extent of oscillatory movement of the worm gear quadrant 52 to prevent disengagement of the same from the worm 86 when the hand crank 100 is turned to effect swinging of the sash 42. The means for this purpose comprises abutment portions 112 and 113 cooperating respectively with end faces 114 and 115 of the worm gear quadrant 52. The abutment portion 112 on the housing 67, it will be noted, is formed by the shouldered portion 73 at the upper part of said housing section, the same extending at one end of and across that part of the chamber 71 formed in the other housing section 68. The other abutment portion 113 on the lower part of the housing section 67 is formed integral therewith and projects inwardly therefrom in the path of movement of the end face 114 of the worm gear quadrant 52.

The worm gear quadrant 52, as shown, is relatively large to provide for a considerable reduction between the same and the worm 86. An important feature of the invention resides in the special construction of the hollow extruded metal sill member that permits the rock shaft 49 with the relatively large size worm gear quadrant 52 fixed thereon, to be readily inserted into the same after the window frame has been installed in the window opening, without bending the sill structure, without making the same oversize, and without the use of any tools so that installation of the rock shaft, the gearing associated therewith and the mounting or supporting means for the rock shaft, does not have to be made at the factory.

Referring now particularly to Figs. 4, and 11 to 15 of the drawings, it will be seen that the distance between the outer edge 36ᵃ of the flange 36 of the rear side wall 35 of the hollow sill member 29 and the upper edge 34ᵇ of the front side wall 34 of the sill member is less than the distance indicated by the dotted line a—b of the outer edges of the end teeth 115ᵃ and 116 of the worm gear quadrant 52 from each other, but sufficiently greater than the distance indicated by the dotted line c—d from the base line e of the end tooth 116 at the inner side thereof to the outer face of the partly circular inner hub part 117 of the worm gear quadrant at the point f to allow the end tooth 116 of the worm gear quadrant to pass by the outer edge 36ᵃ of the flange 36 of the sill member simply by positioning the worm gear quadrant 52 relative to the sill member 29, as shown in Fig. 13 of the drawing, with the edge 36ᵃ of the flange extension 36 disposed between the end tooth 116 and the adjacent tooth 118 of the worm gear quadrant, and then turning the worm gear quadrant slightly in the direction of the arrow. The rock shaft 49 and the worm gear quadrant 52 can then be moved to the position shown in Fig. 15 so that the rock shaft rests upon the intermediate concave section 39 of the reinforcing septum 38. This positioning of the rock shaft 49 with the worm gear quadrant 52 relative to and within the sill member 29 can be easily done by supporting the rock shaft by grasping the crank arms 48 thereof in either hand as illustrated in Fig. 4 of the drawings.

Figure 17:
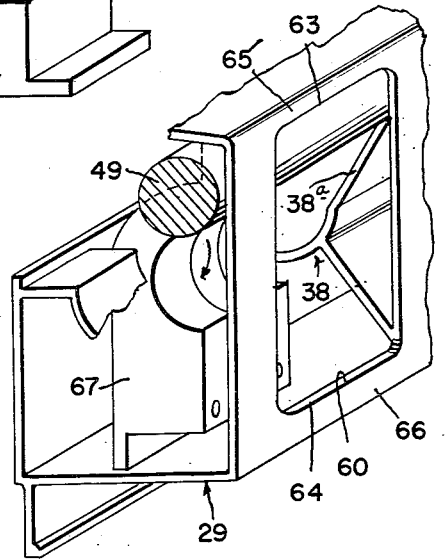
Figure 18:
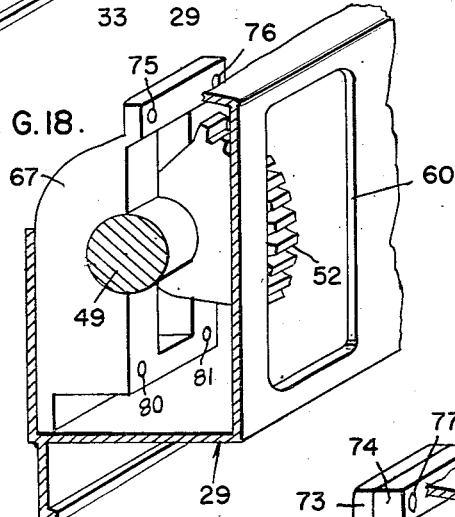
Fig. 18 is a fragmentary perspective view of the sill member and the one section of the mounting or housing for the rock shaft, seated therein.
Figure 19:
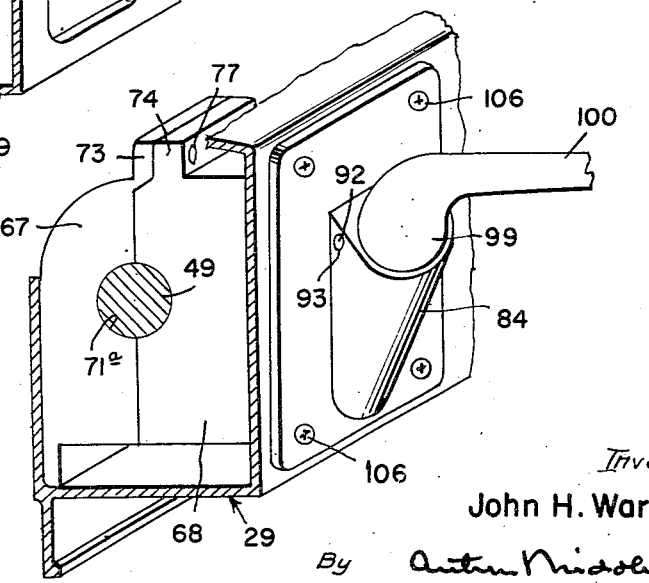
Fig. 19 is a fragmentary perspective view of the sill member showing both sections of the mounting or housing for the rock shaft and operator shaft, secured therein.

After the rock shaft 49 with the worm gear quadrant 52 fixed thereon has been placed within the sill member, the sectional housing 67, 68 can be easily introduced into the hollow sill member and properly positioned to enclose the worm gear quadrant and support the rock shaft, through the opening 60 in the rear side wall 35 of the sill member 29 as illustrated in Figs. 16, 17 and 18. The rock shaft is lifted upwardly from the concave section 39 of the septum 38 to the position shown in Fig. 16, the housing section 67 being then moved laterally into the sill member beneath the rock shaft and canted slightly to move its upper part around and to one side of the rock shaft, the latter being gradually lowered and moved slightly laterally so that the same is brought into alignment with and enters the semi-circular shaped recessed portion 71ª of the housing section, and the lower part of the housing section is moved laterally into position against the inner face of the front wall 34 of the sill member. The housing section 68 is then inserted into the sill member by first canting the same to move the upper part of it past and to the rear side of the narrow wall portion 65 bordering the upper edge of the opening 60 and then tilting the housing section back to vertical position and moving the same laterally until it is in mating relationship with the housing section 67, the two housing sections 67, 68 being then secured by the fastening screws 77 and 78, the latter extending from the exterior of the front side wall 34 of the sill member through apertures 119 therein and serving to secure the housing sections to the front wall 34 of the sill member. The securing of the housing sections within the sill member is then completed by securing the attaching plate 108 to the rear side wall 35 of the sill member by applying the screws 106.

As shown in Figs. 7 and 16, a removable cover member designated generally 120, is provided, the same being formed of extruded aluminum and being of inverted L-shape form in cross section, the same having a vertically extending side wall 121 the lower marginal portion 122 of which is offset laterally to fit against the outer face of the front side wall 34 of the sill member. The horizontal wall 123 of the cover member has a vertically directed extension 124 adapted to fit against a packing strip (not shown) to be mounted in a longitudinal groove 125 in the inwardly directed extension 37 of the flange 36 on the rear side wall 35 of the sill member. The cover member 120 which is secured to the front side wall 34 of the sill member by screws (not shown) closes the space at the front side of the sill member 29 between the front side wall 34 thereof and the extension 37 of the flange 36, the lower marginal edge portion 126 of the bottom rail 127 of the lowermost sash 42 fitting against the upper side marginal portion of the vertical side wall 121 of the cover member when the sash 42 is moved to closed position by the operating mechanism.

It will be noted that the invention provides a hollow extruded metal sill member reinforced in an efficient way to strongly resist strains tending to bend the side walls thereof apart, and the housing 67, 68 for the worm gear quadrant 52 is securely held seated in the sill member so that the operator or operator shaft can be operated with considerable force so that the sash can be closed sufficiently tight against the window frame to make them weather-tight as desired without deformation of the side walls of the sill member and without tilting of the operator shaft out of proper alignment and stripping the gears, a smooth, satisfactory operation of the operating means being insured even under adverse conditions of careless turning of the operator shaft harder than is necessary. The special arrangement of the operator shaft 85 extending at an upward outward inclination from the rear side wall of the sill member with the hand crank 100 disposed at an obtuse angle to the operator shaft and the crank handle extending at an inclination to the crank substantially parallel with the operator shaft as shown in Fig. 6 of the drawings, has important advantages. The handle of the hand crank is not only arranged for convenient operation but also provides for disposing the hand crank 100 horizontally below a curtain on the window frame or positioned to extend vertically behind the curtain.

Figure 20:
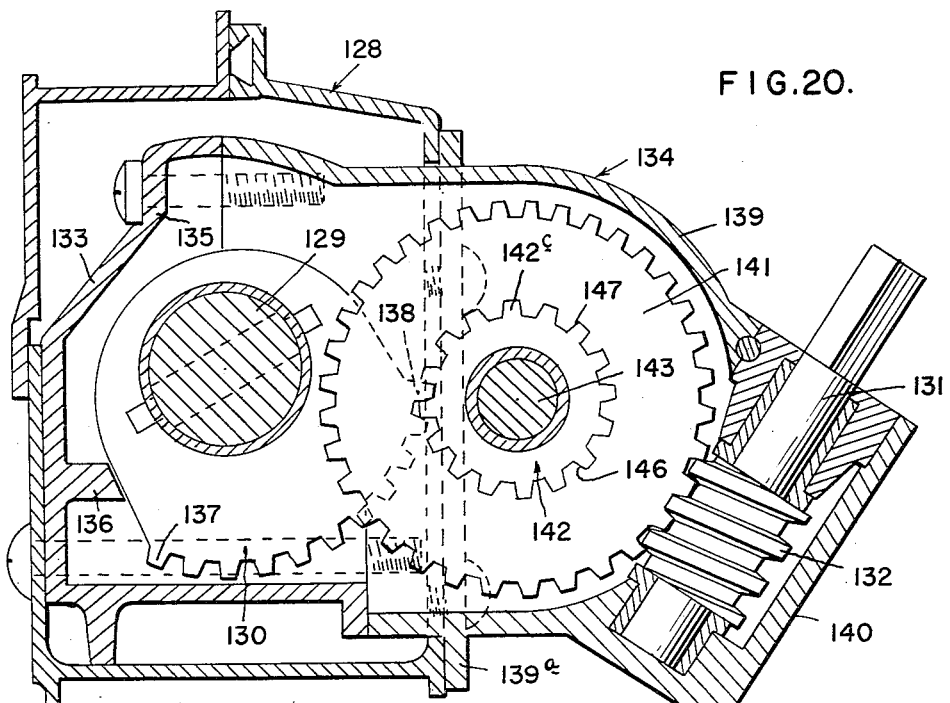
Fig. 20 is a transverse section of the sill member showing a modified form of gearing between the operator shaft and the rock shaft.
Figures 21, 22:
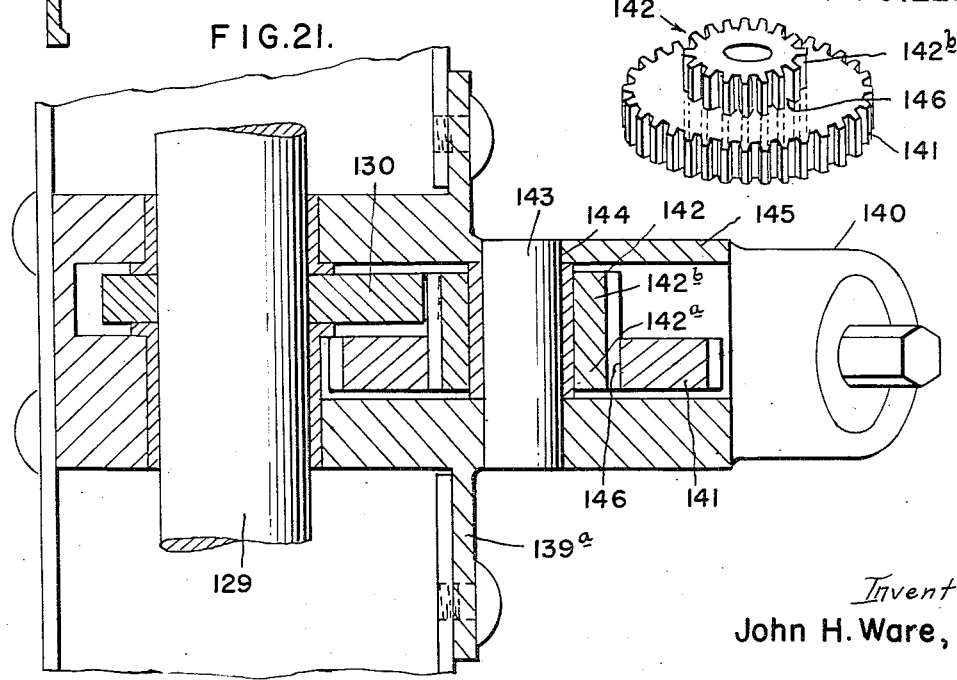
Fig. 21 is a detail horizontal section of the modified construction shown in Fig. 20.
Fig. 22 is a detail perspective view of the reduction gears.

In Figs. 20, 21 and 22 is illustrated a modified form of gearing between the operator shaft and the rock shaft, this modified gearing including additional gear elements providing for a greater ratio of reduction between the worm gear quadrant and the worm on the operator shaft, the modified construction shown in these views being otherwise the same as that hereinbefore described except for certain minor structural differences in the form of the housing sections for the gearing.

In these views, 128 generally designates the hollow reinforced extruded metal sill member, 129 the rock shaft with the worm gear quadrant 130 fixed thereon, 131 is the operator shaft and 132 is the worm on the operator shaft.

The housing sections for the gearing are designated respectively 133 and 134, the same being mounted within and secured to each other and to the sill member 128 in substantially the same way as in the construction hereinbefore described in detail. The numerals 135 and 136 designate the pair of abutments on the housing section 134 cooperating with the end faces 137 and 138 of the worm gear quadrant 130 to limit the extent of rocking movement of the same. The housing section 134, in the present instance, as shown has a curved front wall portion 139 extending outwardly from the attaching plate portion 139ª and merging into the lower part of the upwardly and outwardly inclined tubular part 140 in which the operator shaft 131 is journaled.

Interposed between the worm 132 and the worm gear quadrant 130 is a reduction cluster gear comprising a relatively large worm gear 141 and a small worm gear 142, the two worm gear elements being rigidly secured together and mounted for rotation on a transverse shaft 143 fixedly mounted at opposite end portions in openings 144 in the side walls 145 of the housing section 134, the smaller worm gear element 142 and the other worm gear element 141 meshing respectively with the worm gear quadrant 130 and worm 132.

The reduction gear elements 141 and 142 are secured together in the following way. The smaller gear element 142 is made of a width sufficiently greater than the width of the larger gear element 141 to provide an end portion 142ª to fit within a central opening 146 provided in the larger gear element 141 with a portion 142ᵇ disposed at one side of the larger gear element 141. The central opening 146 includes short radially extending slots 147 to receive the teeth 142ᶜ of the smaller gear element 142. The size of the central opening 146 in the larger gear element 141 and the radial slots 147 are slightly smaller than the main body part of the smaller gear element 142 and the teeth 142ᶜ of the latter, the relative size of the parts being such that when the end portion 142ª of the smaller gear element 142 is inserted under pressure into the central opening 146 in the larger gear element 141, the two gear elements tightly interfit, one with the other, and are rigidly secured together against relative endwise movement as well as being interlocked to rotate together.

The modified form of gearing shown in Figs. 20, 21 and 22 provides for a great ratio of reduction (as much as 30 to 1) between the worm gear quadrant and the worm on the operator shaft.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. An aluminum awning type window structure including a rectangular window frame having an extruded metal sill member of channel form having a front and rear side wall, the rear side wall of the sill member having a longitudinal flange extending forwardly from the upper edge thereof, and the front side wall of the sill member being of less height than the rear side wall thereof forming a space at the front side of the sill member between the upper edge of the front side wall thereof and the outer edge of said flange, the sill member having a reinforcing septum integral therewith extending across the same from one side wall to the other, the septum being provided with a recess intermediate the ends of the sill member extending transversely thereof from one side wall to the other, the rear side wall of the sill member having an opening therein in line transversely of the sill and leading into said recess in the septum, a plurality of superposed rectangular window sash pivotally mounted in the window frame for swinging movement in a vertical plane, an operating mechanism for swinging the sash in unison including a horizontally extending rock shaft within the sill member supported for turning on the septum, a worm gear segment fast on the rock shaft, a housing for the worm gear segment of general rectangular shape comprising two mating sections detachably secured to each other and removably held seated in said recess in the septum, a rotary operator shaft mounted in and carried by one of the housing sections, a worm fast on the inner end portion of the operator shaft meshing with said worm gear segment, the rock shaft with the worm gear segment fixed thereon being inserted within the sill member through the space at the front side of the same after the window frame has been installed in a window opening, and said housing sections being inserted into the sill member through said opening in the rear side wall thereof and assembled around said worm gear segment and shaft and seated in said recess.

2. An aluminum awning type window structure according to claim 1 with crank arms secured to the ends of the rock shaft, said crank arms supporting the rock shaft to facilitate the introduction of said shaft and gear segment through said space into the sill member.

3. An aluminum awning type window structure including a rectangular window frame having an extruded metal sill member of channel form having a front and rear side wall, the rear side wall of the sill member having a longitudinal flange extending forwardly from the upper edge thereof, and the front side wall of the sill member being of less height than the rear side wall thereof forming a space at the front side of the sill member between the upper edge of the front side wall thereof and the outer edge of said flange, the sill member having a reinforcing septum integral therewith extending across the same from one side wall to the other, the septum being provided with a recess intermediate the ends of the sill member extending transversely thereof from one side wall to the other, the rear side wall of the sill member having an opening therein in line transversely of the sill and leading into said recess in the septum, a plurality of superposed rectangular window sash pivotally mounted in the window frame for swinging movement in a vertical plane, an operating mechanism for swinging the sash in unison including a horizontally extending rock shaft within the sill member supported for turning on the septum, a worm gear segment fast on the rock shaft, a housing for the worm gear segment of general rectangular shape comprising two mating sections detachably secured to each other and removably held seated in said recess in the septum, each having side walls provided intermediate their upper and lower ends with complementary semi-circular shaped recessed portions fitting around and forming supporting bearings for the rock shaft at either side of the worm gear segment, a rotary operator shaft mounted in and carried by one of the housing sections, a worm fast on the inner end of the operator shaft meshing with said worm gear segment, the rock shaft with the worm gear segment fixed thereon being inserted within the sill member through the space at the front side of the same after the window frame has been installed in the window opening, and said housing sections being inserted separately into the sill member through said opening in the rear side wall thereof and assembled around said worm gear segment and shaft and seated in said recess.

4. An aluminum awning type window structure as defined in claim 3 in which one of the housing sections has an attaching plate portion at the outer side thereof fitting against and detachably secured to the rear side wall of the sill member, said housing section having a tubular extension extending upwardly and outwardly at an inclination from the lower outer face of said attaching plate portion and in which the rotary operator shaft is journaled.

References Cited in the file of this patent

UNITED STATES PATENTS

| | | |
|---|---|---|
| 2,304,960 | Schane | Dec. 15, 1942 |
| 2,482,170 | Gunnison | Sept. 20, 1949 |
| 2,528,572 | Bancroft | Nov. 7, 1950 |
| 2,637,547 | Schottenberg | May 5, 1953 |
| 2,641,465 | Snow | June 9, 1953 |
| 2,663,389 | Girschowitch | Dec. 22, 1953 |
| 2,667,950 | Bancroft | Feb. 2, 1954 |
| 2,693,622 | Brenner | Nov. 9, 1954 |
| 2,742,676 | Klee | Apr. 24, 1956 |

FOREIGN PATENTS

| | | |
|---|---|---|
| 1,001,910 | France | Oct. 31, 1951 |